United States Patent [19]

Bernauer

[11] Patent Number: 4,736,779

[45] Date of Patent: Apr. 12, 1988

[54] PROCESS AND APPARATUS FOR USING A HYDRIDE-FORMING ALLOY TO STORE HYDROGEN

[75] Inventor: Otto Bernauer, Moers, Fed. Rep. of Germany

[73] Assignee: Daimler-Benz Aktiengesellschaft, Fed. Rep. of Germany

[21] Appl. No.: 854,529

[22] Filed: Apr. 22, 1986

[30] Foreign Application Priority Data

Apr. 22, 1985 [DE] Fed. Rep. of Germany ....... 3514500

[51] Int. Cl.$^4$ ............................................... B65B 3/04
[52] U.S. Cl. ................................................ 141/4; 34/15; 48/190; 55/523; 62/48; 220/3; 220/901; 423/248; 423/648 R
[58] Field of Search .................... 141/1-12; 48/190; 34/15; 62/48; 220/3, 901; 423/248, 648 R; 55/523

[56] References Cited

U.S. PATENT DOCUMENTS

| | | | |
|---|---|---|---|
| 3,479,165 | 11/1969 | Lyon | 48/190 |
| 4,134,490 | 1/1979 | Turillon et al. | 206/0.7 |
| 4,153,083 | 5/1979 | Imler et al. | 141/4 |
| 4,375,257 | 3/1983 | Bruning et al. | 206/0.7 |
| 4,446,101 | 5/1984 | Bernauer et al. | 420/424 |
| 4,611,641 | 9/1986 | Carter | 141/4 |

FOREIGN PATENT DOCUMENTS

| | | |
|---|---|---|
| 3210381 | 5/1983 | Fed. Rep. of Germany . |
| 1591875 | 11/1977 | United Kingdom . |
| 2015142 | 2/1979 | United Kingdom . |
| 2129534 | 4/1983 | United Kingdom . |

Primary Examiner—Houston S. Bell, Jr.
Attorney, Agent, or Firm—Barnes & Thornburg

[57] ABSTRACT

A process is provided for optimizing the storage capacity, based on weight, of a hydrogen storage device containing a hydride-forming alloy. A corresponding hydrogen storage device is also provided wherein the storage device is designed to operate under a pressure of 100 to 300 bars, and the weight of hydride-forming alloy contained within the device is about 0.8 to 2 kg of hydride-forming alloy per liter of internal volume. As an added benefit attendant this process and device, the hydrogen gas stored in the device is purified thereby.

12 Claims, 1 Drawing Sheet

PROCESS AND APPARATUS FOR USING A HYDRIDE-FORMING ALLOY TO STORE HYDROGEN

BACKGROUND AND SUMMARY OF THE INVENTION

The present invention relates generally to a process for optimizing the storage capacity, based on weight, of a hydrogen storage device containing a hydride-forming alloy, and to a corresponding hydrogen storage device.

Hydrogen storage devices which are currently in use and in which hydrogen is stored in a hydride-forming alloy contain for example such hydrogen-storing alloys as TiFe hydrides or hydrides of the C 14 Laves phase (crystal structure), which have a storage capacity for $H_2$ of between about 1.6 and 1.9% by weight, based on the alloy. Such crystal structures are well-known in the prior art and are discussed in more detail in scientific reference works such as Roempps Chemical Dictionary and D'Ans Lax Handbook of Chemistry and Physics, Volume 1, pp. 629–631. When 3d transition metals (i.e., those having incomplete orbitals or exhibting a tendency to form one or more cations having incomplete orbitals) are used, the hydrogen capacities are between about 1.8 and 3% by weight, based on the alloy material and depending on the operating pressures and the discharge temperatures. Preferred alloy compositions are disclosed in U.S. Pat. No. 4,446,101 and DE-PS No. 32 10 381 which are hereby incorporated by reference.

The hydrogen storage devices which contain these storage alloys are currently designed to operate under a pressure of about 50 bars. The hydride loading weights are about 3 to 4 kg per liter when hydrides based on the 3d transition metals are used. Loading weights are understood as meaning the weight of storage alloy which is present in the storage device, per liter of hydrogen storage volume. When other storage alloys are used, the loading weights vary according to the atomic or molecular weights.

The storage capacities effectively to be achieved in these storage devices are about half the storage capacity of the storage alloy, based on the weight of the total storage device. For example, with TiFe hydrides or hydrides of the C14 Laves phase, which store between 1.6 and 1.9% by weight of hydrogen, based on the alloy, effective capacities of only 0.8 to 1.0% by weight, based on the total weight of the storage device, are achieved.

An object of the present invention is the provision of a Process which optimizes the storage capacity, based on weight, for hydrogen, so that more hydrogen than before can be stored per unit weight of the storage device.

Another object of the present invention is the provision of a storage device for optimized storage of hydrogen.

These and other objects of the present invention are attained by the provision of a process for optimizing storage capacity of a hydrogen storage device containing a hydride-forming alloy and a hydrogen storage device corresponding thereto. The hydrogen storage device is partially filled with a hydride-forming alloy which contains at least 0.8 kg of hydride-forming alloy per liter of internal volume and preferably about 0.8–2 kg of hydride-forming alloy per liter to a volume. The container is then charged with hydrogen gas of a pressure of at least 100 bars and preferably to a pressure of between 100 and 300 bars. The corresponding hydrogen storage container is designed to accommodate such pressures and to hold the requisite quantity of hydride-alloy per liter of internal volume.

Further objects, features, and advantages of the present invention will become more apparent from the following description when taken with the accompanying drawings, which show for purposes of illustration only, an embodiment constructed in accordance with the present invention.

DETAILED DESCRIPTION OF THE DRAWINGS

According to the invention, not only the hydride-forming alloy capacity but also the free gas volume formed by the voids between the particles of the storage alloy and by other free gas volumes inside the storage container are used for increased storage of hydrogen. The storage device is designed to operate under a pressure of 100 bars to 300 bars and is charged with hydrogen to such an operating pressure The weight of hydride-forming alloy in the storage device is such that the storage device contains 0.8 to 2 kg of hydride-forming alloy per liter of (internal) volume. This is substantially less than the amount of storage material used in prior art hydride storage devices employed to date, since previous efforts were predominantly directed at accommodating as much storage alloy as possible in the hydrogen storage device.

Under operating pressures which are at the lower limit of the above range, an amount of storage alloy in the region of the upper weight limit is selected Under very high pressures, a smaller amount of storage alloy is used.

Figure 1:
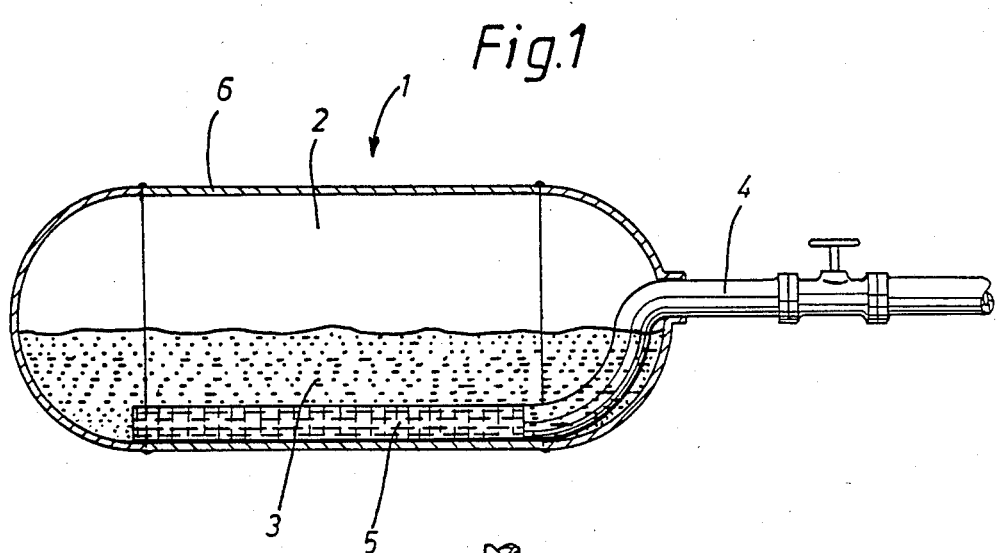
FIG. 1 shows a schematic view of a horizontally disposed storage device in accordance with a preferred embodiment of the present invention.

In FIG. 1, a horizontal storage device 1 is illustrated schematically. This storage device consists of a pressure-tight container 6 which is provided with a take-off Pipe 4. The take-off pipe 4 extends into the bed of storage material and furthermore contains a filter 5 for preventing dust-like particles of storage material from being entrained. The container is only partially filled with hydride storage material 3, while a substantial free gas space 2 is still present.

Figure 2:
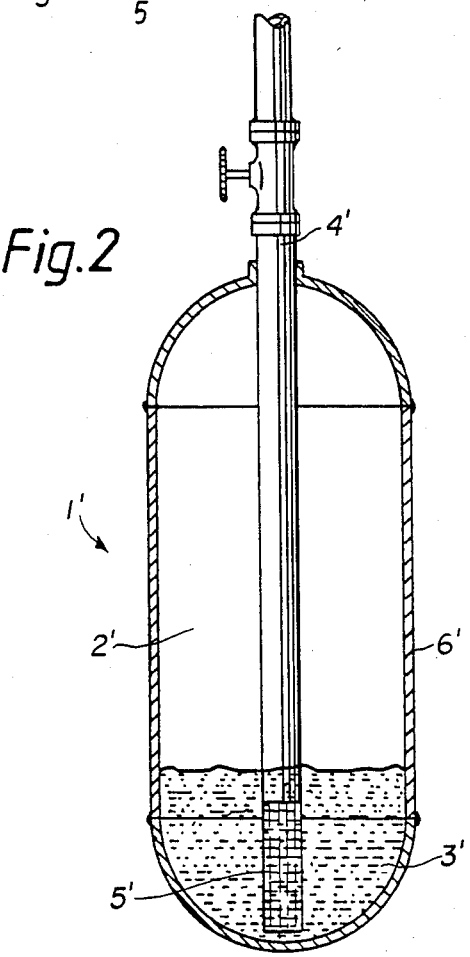
FIG. 2 shows a schematic view of a vertically disposed storage device in accordance with a preferred embodiment of the present invention.

FIG. 2 shows a vertical storage device 1' with analogous components depicted by printed reference characters similar to those discussed above with respect to the FIG. 1 arrangement.

The hydrogen storage capacity of the storage device of the present invention, based on the total mass of the container, is about twice as high as that of a hydride storage device of conventional design. The hydrogen storage capacity, based on the volume of the container, is about twice as high as that of a compressed gas container of conventional design. During charging with hydrogen and discharging of hydrogen, the heat transformation, based on the amount of hydrogen fed in or released, is halved compared with the pure hydride storage device. Therefore, the required heat exchange surfaces are reduced to half the surfaces required for a pure hydride storage device, leading to a substantial reduction in the cost of constructing a storage unit. Furthermore, the storage costs quite generally are substantially reduced when compared with a Pure hydride storage device. This is so because a smaller amount of the expensive hydride material is required, based on the amount of hydrogen stored. On the other hand, the extra costs of the thicker walls necessitated by the greater pressure resistance of the containers of the present invention comprise a relatively insignificant cost contribution.

Moreover, with a storage device of this type, a cleaning effect is achieved with respect to the hydrogen introduced into the device. For example, if the storage device is filled with hydrogen of quality 4.5 (99.995% of $H_2$), containing the foreign gases CO, $H_2$, $N_2$, $O_2$, etc., the quality of the hydrogen which is removed is 6.0 (99.9999% of $H_2$) or better. The cleaning effect is achieved due to the relatively greater affinity of the alloy for impurities such as carbon monoxide in the hydrogen gas than for the hydrogen gas itself. Accordingly, the impurities tend to remain attached to the alloy when the hydrogen is desorbed therefrom.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A process for optimizing hydrogen storage capacity of a hydrogen storage device including a hydride-forming alloy, comprising: charging a pressurizable hydrogen storage container containing at least 0.8 kg of hydride-forming alloy per liter of internal volume with hydrogen gas to a pressure of at least 100 bars for the purpose of optimizing the amount of hydrogen stored in the container.

2. A process according to claim 1, wherein said container contains between about 0.8 and 2 kg of hydride-forming alloy per liter of internal volume.

3. A process according to claim 1, wherein said pressure is between about 100 to 300 bars.

4. A process according to claim 1, wherein said hydride-forming alloy is a titanium and iron alloy.

5. A process according to claim 1, wherein said hydride-forming alloy comprises a transition metal.

6. A process according to claim 1, wherein said hydride-forming alloy comprises C14 Laves Phase.

7. A hydrogen storing device comprising:
pressure type container means containing at least 0.8 kg of hydride-forming alloy per liter of internal volume, said container being charged with hydrogen gas to a pressure of at least 100 bars.

8. A hydrogen storing device according to claim 7, wherein said container means contains between about 0.8 and 2 kg of hydride-forming alloy per liter of internal volume.

9. A hydrogen storing device according to claim 7, wherein said pressure is between about 100 to 300 bars.

10. A hydrogen storing device according to claim 7, wherein said hydride-forming alloy is a titanium and iron alloy.

11. A hydrogen storing device according to claim 7, wherein said hydride-forming alloy comprises a transition metal.

12. A hydrogen storing device according to claim 7, including filtering means for filtering out particulate matter from said hydrogen gas.

* * * * *